Figure 1:
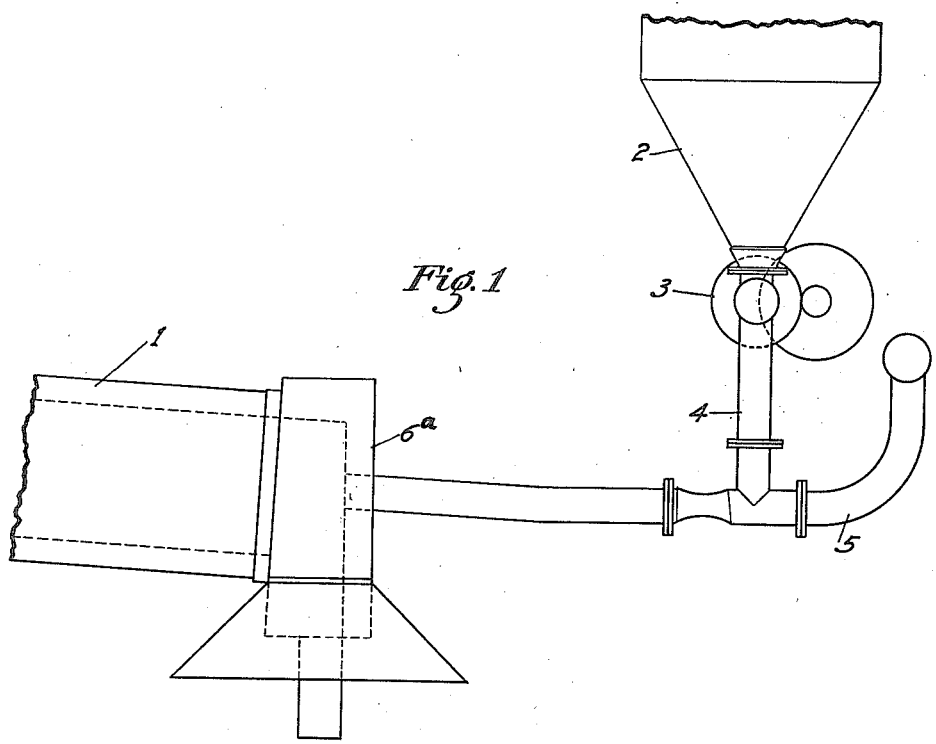

C. J. BARR.
FURNACE LINING MATERIAL AND PROCESS FOR PREPARING SAME.
APPLICATION FILED DEC. 26, 1914.

1,206,771.

Patented Nov. 28, 1916.

Inventor
C. J. BARR

UNITED STATES PATENT OFFICE.

CHARLES J. BARR, OF BIRMINGHAM, ALABAMA, ASSIGNOR TO ALLEN S. DAVISON COMPANY, OF PITTSBURGH, PENNSYLVANIA, A CORPORATION OF PENNSYLVANIA.

FURNACE-LINING MATERIAL AND PROCESS FOR PREPARING SAME.

1,206,771. Specification of Letters Patent. Patented Nov. 28, 1916.

Application filed December 26, 1914. Serial No. 879,146.

*To all whom it may concern:*

Be it known that I, CHARLES J. BARR, a citizen of the United States, residing at Birmingham, in the county of Jefferson and State of Alabama, have invented certain new and useful Improvements in Furnace-Lining Material and Process for Preparing Same, of which the following is a specification.

My invention relates to the production of a refractory material for forming and repairing the bottoms or linings of furnaces, and my object is to produce an artificially prepared substitute for magnesite which is largely used in making furnace bottoms.

In the operation of basic open hearth furnaces, burned magnesite from Austria-Hungary has been found to be the only material which is satisfactory for making refractory furnace linings which will bond together in a way and to resist the washing action of the bath. This calcined Austrian magnesite is not a pure magnesium oxid, but contains sufficient fluxing material in a form of contained impurities, such as silica and iron oxid, to give it this essential cohesive property. Pure magnesia does not bond. I roughly estimate that one hundred thousand tons of this imported magnesite are now used by the steel makers of the United States at an average delivered cost of twenty dollars per ton.

It is an object of the present invention to produce a granular refractory material suitable for lining and repairing basic open hearth furnaces capable of replacing Austrian magnesite for this purpose, using native materials.

We have a large native supply of dolomite which is cheap, and this dolomitic lime has been used to a considerable extent with magnesite to reduce the quantity of the latter in the bottom material and lining, particularly of open hearth or basic steel furnaces. Dolomite, which is a double carbonate of lime and magnesia furnishes a calcined product containing both lime and magnesia which is as highly refractory as calcined magnesite, but it does not contain sufficient fluxing material in the shape of silica or iron oxid to sinter and bond, or to become sufficiently plastic in the furnace heat to form a cohesive lining or bottom that will not wash and disintegrate. The calcined dolomite alone does not bond in the furnace; and it is not as weather proof as calcined magnesite, taking up water and $CO_2$ on standing for any length of time after burning.

The object of my invention is to so treat the dolomite lime, or other like refractory material in which the requisite fluxing material is not present, as to give it the cohesive or bonding property necessary to make a firm bottom; and to produce the treated dolomite at a small cost so that the product may wholly replace the imported Austrian magnesite.

According to my invention I coat granules or grains of calcined dolomite with an envelop or glazing of a somewhat less refractory material having the quality of fusion or cohesion under furnace heat, so that in use the coated grains of dolomitic lime will become firmly set and bonded together. My preferred process for accomplishing this end is as follows: I roast the granulated or grained dolomite to drive out the carbonic acid gas and while the calcined material is in a highly heated and thoroughly shrunk condition I add a coating material, such as basic slag, iron oxids, flue dust, or ground iron ore, in a finely ground or pulverulent condition, and in quantity sufficient to form a coating of substantial thickness for each grain of the dolomite. The heat in calcining should be sufficiently high to thoroughly shrink the material. The quantity of coating material used with the dolomite material varies with the character of each material and of the operating conditions of the furnace in which the prepared bottom or lining material is to be used. It may be stated, however, that the object of my invention is attained where the coating is sufficient in quantity and of a quality to form an effective bond for the incased grains of dolomitic lime.

In the accompanying drawings: Figure 1 illustrates an apparatus which I have used successfully for carrying my process into effect; and Fig. 2 is an enlarged detail sectional view through a portion of a furnace bottom lined with my prepared material.

The crushed or granular dolomite is fed into the upper end (not shown) of a rotary kiln 1 of the ordinary type and passes downward therethrough as a traveling stream against flame gases and flame passing in the opposite direction. In their passage the granules are highly heated and deprived of their $CO_2$ and converted into dolomitic lime and thoroughly shrunk. The coating material occurs in the zone of highest heat and as the grains or granules pass through this zone they pick up such coating material as they roll and each granule is substantially coated when it falls from the kiln. The coating material is fed from hopper 2 by any suitable feed mechanism into pipe 4 through which it is carried into the hot zone at the mouth of the kiln. This pipe may be, as shown, connected to pipe 5 which carries the fuel blast into the kiln. Under the kiln heat, the coating material fuses or softens and adheres to and coats the surface of the very hot granules of calcines. The coating process should be so conditioned as not to cause the coated grains to cohere in the kiln, but to deliver them as separate coated particles which are ready to be applied, in the same manner as calcined magnesite, to form the furnace bottom.

Figure 2:
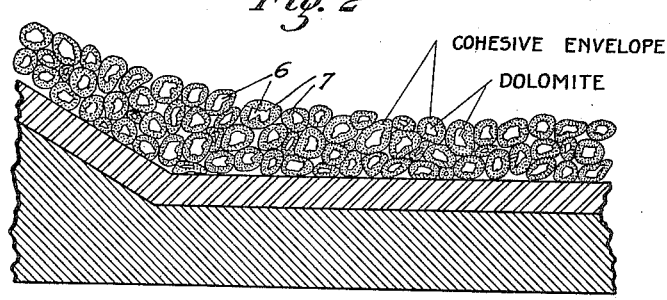

In Fig. 2 I show, enlarged, a section of furnace bottom lined with the present material in which the grains 6 are shown each coated with an envelop 7 of slag, flue dust, ground iron ore, or a like material, which envelops have fused under the furnace heat and bonded the grains 6 firmly in place in the furnace bottom.

A great advantage of my invention is that the coated grains of magnesium calcium oxids will absorb moisture much less rapidly than the unprotected dolomitic lime and hence my material can be stored and shipped. Granular calcined dolomitic lime made in accordance with the usual practice, that is, without the use of the present invention, ordinarily must be produced at the point of use since unprotected dolomitic lime reabsorbs moisture and carbon dioxid on shipment or storage.

My process may be extended to the treatment of other highly refractory bodies than dolomite, such as Californian or Grecian magnesite which yield pure magnesia on calcining and do not contain sufficient fluxing material, such as silica or iron oxid, to set or bond in the furnace bottom and produce a permanent lining.

When I refer to dolomite herein I mean to include such other bodies.

What I claim as new and desire to secure by Letters Patent, is:—

1. An artificially prepared granular furnace bottom material consisting of grains of non fluxing refractory material separately coated with a less refractory normally non-cohesive envelop which is sufficiently fusible in furnace heat to set and permanently bond the said grains of refractory material.

2. An artificially prepared granular furnace bottom material consistitng of roasting grains of dolomite and coating the roasted grains with an envelop of slag, to set and bond the dolomite.

3. The hereindescribed process for manufacturing a furnace bottom material which consists in roasting dolomite grains and coating the hot grains with a less refractory envelop which will fuse and set in the furnace.

4. The hereindescribed process for manufacturing a furnace bottom material which consists in roasting dolomite grains in a rotary kiln, blowing pulverized slag into the discharge end of the kiln, and maintaining a temperature at such discharge end as will cause the pulverized material to fuse and coat separately the grains of highly heated dolomite.

5. As a new material, a body of granules of basic hard burnt material, such granules being coated and sealed with a layer of less refractory material adapted to serve as a bonding agent on exposure to high temperatures.

6. As a new material, a body of granules of hard burnt magnesian lime, such granules being coated and sealed with a layer of less refractory material adapted to serve as a bonding agent on exposure to higher temperatures.

7. As a new material, a body of granules of basic hard burnt material, such granules being coated and seated with a layer of less refractory silicious material.

8. As a new material, a body of granules of hard burnt magnesian lime, such granules being coated and sealed with a layer of refractory silicious material.

9. As a new material, a body of granules of basic hard burnt material, such granules being coated and sealed with a layer of basic open hearth slag.

10. The process of producing materials for furnace linings which comprises agitating granules of basic refractory material at a high temperature in the presence of fine and less refractory material until such refractory material film coats the surface of such granules.

11. The process of producing materials for furnace linings which comprises agitating granules of basic refractory material with powdered basic open hearth slag at a high temperature until such open hearth slag film coats the surface of such granules.

12. The process of producing materials for furnace linings which comprises agitating granules of dolomitic lime with less refractory material at a high temperature until such refractory material film coats the surface of such granules.

13. The process of producing materials for furnace linings which comprises agitating granules of dolomitic lime with powdered basic open hearth slag at a high temperature until such open hearth slag-film coats the surface of such granules.

14. A furnace lining material, comprising a substance containing magnesium oxid, the particles of the said substance being coated with a material which protects the particles against atmospheric conditions.

15. A furnace repair material, comprising a substance in the form of granules which contain magnesium oxid, said granules being coated with a material which protects the granules against atmospheric action.

16. A material for the repairing of furnace linings, comprising particles of calcined dolomite, the particles of the latter being coated with an adhering layer of material which protects them from moisture.

In testimony whereof I affix my signature in presence of two witnesses.

CHARLES J. BARR.

Witnesses:
R. D. JOHNSTON, Jr.,
NOMIE WELSH.